United States Patent
Schmitt et al.

(10) Patent No.: US 11,572,462 B2
(45) Date of Patent: Feb. 7, 2023

(54) HIGH MELT STRENGTH POLYPROPYLENES WITH IMPROVED PROCESSABILITY

(71) Applicant: ExxonMobil Chemical Patents Inc., Baytown, TX (US)

(72) Inventors: Sasha P. Schmitt, Houston, TX (US); George J. Pehlert, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 262 days.

(21) Appl. No.: 16/477,463

(22) PCT Filed: Jan. 3, 2018

(86) PCT No.: PCT/US2018/012140
§ 371 (c)(1),
(2) Date: Jul. 11, 2019

(87) PCT Pub. No.: WO2018/147944
PCT Pub. Date: Aug. 16, 2018

(65) Prior Publication Data
US 2020/0255641 A1    Aug. 13, 2020

Related U.S. Application Data

(60) Provisional application No. 62/455,707, filed on Feb. 7, 2017.

(30) Foreign Application Priority Data

Mar. 13, 2017    (EP) ..................................... 17160477

(51) Int. Cl.
*C08L 23/12*    (2006.01)
*C08J 9/02*    (2006.01)

(52) U.S. Cl.
CPC ............... *C08L 23/12* (2013.01); *C08J 9/02* (2013.01); *C08J 2201/03* (2013.01); *C08J 2323/12* (2013.01); *C08J 2423/12* (2013.01); *C08L 2205/025* (2013.01)

(58) Field of Classification Search
CPC ..... C08L 23/12–16; C08L 2323/10–14; C08L 2205/025; C08L 23/26–36; C08L 2023/40–44
See application file for complete search history.

(56) References Cited

U.S. PATENT DOCUMENTS

| | | | |
|---|---|---|---|
| 4,897,452 A | 1/1990 | Berrier et al. | |
| 6,103,833 A | 8/2000 | Hogt et al. | |
| 9,410,034 B2 | 8/2016 | Klimke et al. | |
| 10,457,789 B2 | 10/2019 | Zhao et al. | |
| 2003/0119996 A1 | 6/2003 | Kitano et al. | |
| 2008/0058437 A1* | 3/2008 | Burgun | C08L 23/10 521/140 |
| 2010/0222470 A1 | 9/2010 | Basfar et al. | |
| 2012/0270039 A1* | 10/2012 | Tynys | D01D 5/0985 428/338 |
| 2013/0203908 A1* | 8/2013 | Kock | C08L 23/142 524/119 |
| 2015/0018463 A1 | 1/2015 | Chikhalikar et al. | |
| 2015/0064487 A1* | 3/2015 | Laiho | A61B 50/30 428/513 |
| 2015/0133590 A1 | 5/2015 | Klimke et al. | |
| 2015/0175789 A1 | 6/2015 | Klimke et al. | |
| 2015/0203621 A1 | 7/2015 | Prokschi et al. | |
| 2016/0108220 A1 | 4/2016 | Prokschi et al. | |
| 2017/0226327 A1* | 8/2017 | Kabeya | C08K 7/02 |

FOREIGN PATENT DOCUMENTS

| | | |
|---|---|---|
| EP | 1159309 B | 9/2009 |
| EP | 2325248 A | 5/2011 |
| EP | 2386601 A | 11/2011 |
| EP | 2433982 A | 3/2012 |
| EP | 3018155 A | 5/2016 |
| JP | 2010-043162 A | 2/2010 |
| WO | 2010/049371 A | 5/2010 |
| WO | 2014/070384 A | 5/2014 |
| WO | 2015/200586 A | 12/2015 |
| WO | 2016/053468 A | 4/2016 |
| WO | WO 2016/051561 A1 * | 4/2016 |

OTHER PUBLICATIONS

Shivokhin, M. E, et al., "The influence of molecular weight distribution of industrial polystyrene on its melt extensional and ultimate properties" Polymer Engineering & Science, V. 56, No. 9, pp. 1012-1020, 2016.

* cited by examiner

*Primary Examiner* — Ana L. Woodward
(74) *Attorney, Agent, or Firm* — Vorys, Safer, Seymour and Pease LLP

(57) ABSTRACT

A polypropylene composition suitable for foaming having improved processability but maintained strain hardening and the process to produce the polypropylene composition comprising combining a linear polypropylene having a melt strength within a range from 10 to 40 cN (190° C.) with an organic peroxide to obtain a branched polypropylene having a melt strength within a range from 20 to 80 cN (190° C.), wherein the melt strength of the branched polypropylene is greater than the melt strength of the linear polypropylene; and combining the branched polypropylene having a melt flow rate within a range of 0.1 to 20 g/10 min and an Mw/Mn of at least 5 with within a range from 5 to 40 wt % of a low molecular weight polyolefin having a melt flow rate of at least 50 g/10 min and an Mw/Mn of less than 5 to obtain the polypropylene composition.

21 Claims, 4 Drawing Sheets

HIGH MELT STRENGTH POLYPROPYLENES WITH IMPROVED PROCESSABILITY

CROSS-REFERENCE OF RELATED APPLICATIONS

This application is a National Phase Application claiming priority to PCT Application Serial No. PCT/US2018/012140 filed Jan. 3, 2018, which claims the benefit of Provisional Application No. 62/455,707, filed Feb. 7, 2017 and European Application No. 17160477.0, filed Mar. 13, 2017, the disclosures of which are incorporated herein by their reference.

FIELD OF THE INVENTION

The present disclosure relates to improved processing of branched polypropylene, and in particular to blends of a branched polypropylene and low molecular weight polyolefin.

BACKGROUND OF THE INVENTION

The applicability of polypropylene in industrial extrusion processes that involve both shear and extensional flows has been limited. This is partially due to its low melt strength and lack of strain hardening. Multiple approaches have been attempted in the industry to improve the melt strength and strain hardening of polypropylenes including increasing the molecular weight, broadening of the molecular weight distribution (Mw/Mn), addition of an ultra-high molecular weight tail and/or the addition of long chain branching (LCB).

While polypropylenes having improved melt strength and strain hardening have been made, these polypropylenes tend to have very high shear viscosity, making them difficult to process. It would be useful to find a polypropylene with high melt strength and strain hardening, but with a broadened process operating window for applications such as foaming and thermoforming. One way this is accomplished is to reduce the process temperature via addition of a low molecular weight additive to reduce the viscosity. However, a challenge with this approach is the reduction of strain hardening at higher concentrations of the low molecular weight additive. A better approach is needed.

Related publications include US 2015/0018463; US 2010/0222470; US 2003/0119996; U.S. Pat. Nos. 4,897,452; 6,103,833; 9,410,034; EP 1 159,309 B1; EP 2 325 248 A1; EP 2 386 601 A1; EP 2 433 982 A1; WO 2010/049371; WO 2014/070384; WO 2015/200586; WO 2016/053468; and JP 2010-043162 A; and M. E. Shivokhin, L. Urbanczyk, J. Michel, and C. Bailly, in "The influence of molecular weight distribution of industrial polystyrene on its melt extensional and ultimate properties", 56(9) POLYMER ENGINEERING & SCIENCE, 1012-1020 (September 2016).

SUMMARY OF THE INVENTION

Described herein is a process to produce a polypropylene composition comprising (or consisting of, or consisting essentially of) combining a branched polypropylene with a low molecular weight polyolefin having a melt flow rate (ASTM D1238, 230° C./2.16 kg) of at least 50 g/10 min to obtain a polypropylene composition. Described more particularly is a process to produce a polypropylene composition comprising (or consisting of, or consisting essentially of) combining a linear polypropylene having a melt strength within a range from 10 to 40 cN (190° C.) with an organic peroxide to obtain a branched polypropylene having a melt strength within a range from 20 to 80 cN (190° C.), wherein the melt strength of the branched polypropylene is greater than the melt strength of the linear polypropylene; and combining the branched polypropylene having a melt flow rate within a range of 0.1 to 20 g/10 min and an Mw/Mn of at least 5 within a range from 5 to 40 wt %, by weight of the branched polypropylene and polypropylene homopolymer, of a polypropylene homopolymer having a melt flow rate of at least 50 g/10 min and an Mw/Mn of less than 5 to obtain a polypropylene composition; wherein the polypropylene composition as a melt flow rate within a range from 0.5 to 40 g/10 min, a melt strength within a range from 20 to 80 cN (190° C.), and exhibits at least 90% the strain hardening that is exhibited by the branched polypropylene.

Also described is a polypropylene composition comprising (or consisting essentially of) a branched polypropylene and a low molecular weight polyolefin having a melt flow rate of at least 50 g/10 min. Described more particularly is a foamed, thermoformed, and/or extruded article comprising (or consisting essentially of) a polypropylene composition comprising (or consisting essentially of) within a range from 95 to 60 wt %, by weight of the branched polypropylene and polypropylene homopolymer, of a branched polypropylene having a melt strength within a range from 20 to 80 cN (190° C.), and a melt flow rate within a range of 0.1 to 20 g/10 min; and within a range from 5 to 40 wt %, by weight of the branched polypropylene and polypropylene homopolymer, of a polypropylene homopolymer having a melt flow rate of at least 50 g/10 min; wherein the polypropylene composition as a melt flow rate within a range from 0.5 to 40 g/10 min, a melt strength within a range from 20 to 80 cN (190° C.), and exhibits at least 90% the strain hardening that is exhibited by the branched polypropylene.

DETAILED DESCRIPTION

Figure 1:
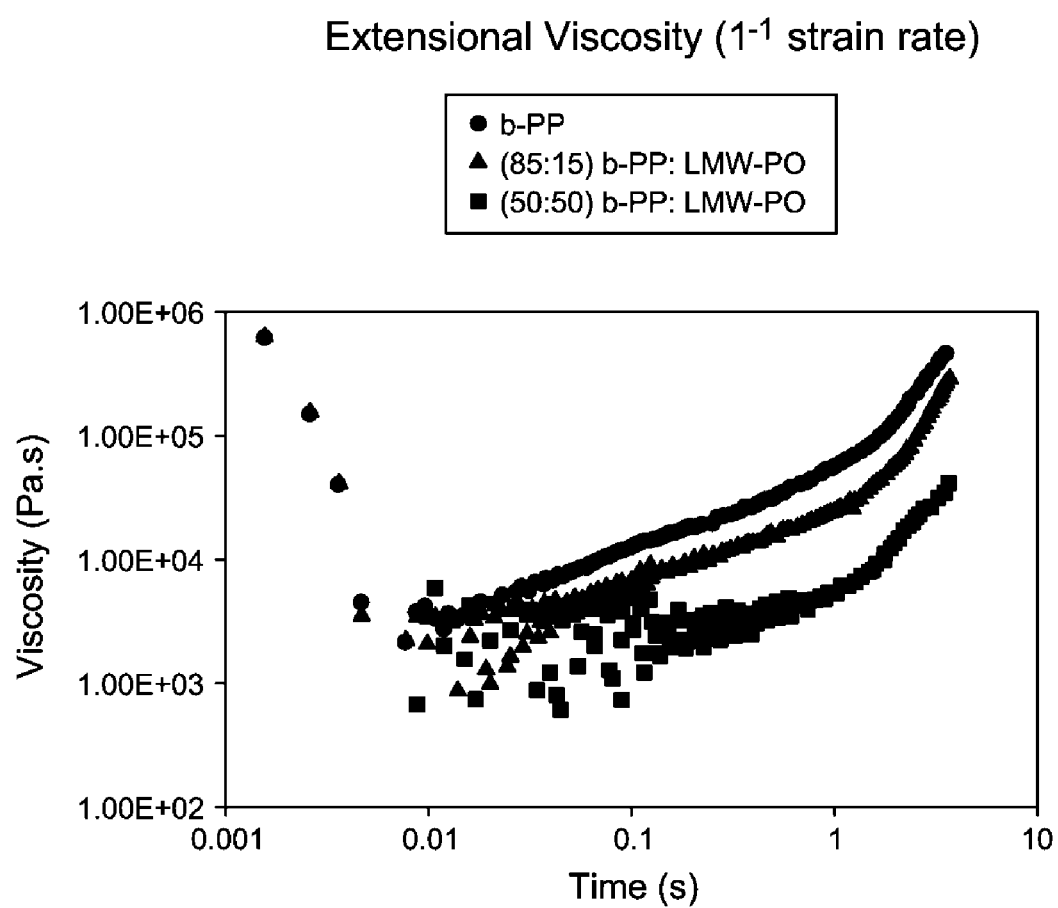
FIG. 1 is extensional rheology traces of a comparative and two inventive blends giving viscosity as a function of time at $1^{-1}$ sec rate.

It was discovered that by judicious selection of the molecular weight and the concentration of a low molecular weight additive, a low molecular weight polyolefin as used herein, the shear viscosity of a high melt strength and strain hardened polypropylene could be reduced while simultaneously maintaining the level of strain hardening (extensional thickening). This behavior is unique and not previously demonstrated for polypropylenes. Strain hardening is critical for industrial applications that involve extensional flow such as in thermoforming, fiber drawing/spinning, blown films, foaming, and other industrial applications that involve both shear and extensional flow deformations. The invention is described in more detail below, ordered based on a description of starting materials and processes that lead to the desired end polypropylene composition.

Linear Polypropylene

Here and throughout this specification the term "linear polypropylene" refers to a reactor grade polypropylene homopolymer or copolymer that is useful in forming the "branched polypropylene" having a branching index g'(vis) of greater than 0.98. The linear polypropylene that is most preferred in any embodiment of the invention has the properties described herein, and can be made by any means known to those of skill in the art, but most preferably is produced using a Ziegler-Natta succinate-containing catalyst. The properties referred to here are those of the reactor-grade material prior to melt blending or after melt blending with non-peroxide "additives" such as antioxidants, alkyl-radical scavengers, etc. In any embodiment, the desirable linear polypropylene is a homopolymer of propylene-derived units, or is a copolymer comprising within a range of from 0.20 or 0.40 or 0.80 wt % to 1.0 or 2.0 or 4.0 or 6.0 wt %, by weight of the linear polypropylene, of ethylene or $C_4$ to $C_{12}$ α-olefin derived units, most preferably ethylene, 1-butene or 1-hexene derived units, the remainder being propylene-derived units.

Ziegler-Natta catalysts suitable to produce the useful linear polypropylenes include solid titanium supported catalyst systems described in U.S. Pat. Nos. 4,990,479 and 5,159,021, and WO 00/63261, and others. Briefly, the Ziegler-Natta catalyst can be obtained by: (1) suspending a dialkoxy magnesium compound in an aromatic hydrocarbon that is liquid at 20-25° C.; (2) contacting the dialkoxy magnesium hydrocarbon composition with a titanium halide and with a diester of an aromatic dicarboxylic acid; and (3) contacting the resulting functionalized dialkoxy magnesium-hydrocarbon composition of step (2) with additional titanium halide.

The "catalyst system" typically includes solid titanium catalyst component comprising titanium as well as magnesium, halogen, at least one non-aromatic "internal" electron donor, and at least one, preferably two or more "external" electron donors. The solid titanium catalyst component, also referred to as a Ziegler-Natta catalyst, can be prepared by contacting a magnesium compound, a titanium compound, and at least the internal electron donor. Examples of the titanium compound used in the preparation of the solid titanium catalyst component include tetravalent titanium compounds having the formula (I):

$$Ti(OR_n)X_{4-n}, \quad (I)$$

wherein R is a hydrocarbyl radical, X is a halogen atom, and n is from 0 to 4.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition, two or more such hydrocarbyl radicals may together form a fused ring system, including partially or fully hydrogenated fused ring systems, which may include heterocyclic radicals.

Preferably, the halogen-containing titanium compound is a titanium tetrahalide, or titanium tetrachloride. The titanium compounds may be used singly or in combination with each other. The titanium compound may be diluted with a hydrocarbon compound or a halogenated hydrocarbon compound. Non-limiting examples include titanium tetra-halides such as $TiCl_4$, $TiBr_4$, and/or $TiI_4$; alkoxy titanium trihalides including $Ti(OCH_3)Cl_3$, $Ti(OC_2H_5)Cl_3$, $Ti(O\ n\text{-}C_4H_9)Cl_3$, $Ti(OC_2H_5)Br_3$, and/or $Ti(O\text{-iso-}C_4H_9)Br_3$; dialkoxytitanium dihalides including $Ti(OCH_3)_2Cl_2$, $Ti(OC_2H_5)_2Cl_2$, $Ti(O\text{-n-}C_4H_9)_2Cl_2$ and/or $Ti(OC_2H_5)_2Br_2$; trialkoxytitanium monohalides including $Ti(OCH_3)_3Cl$, $Ti(OC_2H_5)_3Cl$, $Ti(O\text{-n-}C_4H_9)_3Cl$ and/or $Ti(OC_2H_5)_3Br$; and/or tetraalkoxy titaniums including $Ti(OCH_3)_4$, $Ti(OC_2H_5)_4$, and/or $Ti(O\text{-n-}C_4H_9)_4$.

Preferably, the magnesium compound to be used in the preparation of the solid titanium catalyst component includes a magnesium compound having reducibility and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. These magnesium compounds may be used singly or they may form complexes with the organoaluminum co-catalyst as described herein. These magnesium compounds may be a liquid or a solid.

Suitable examples of the magnesium compounds having no reducibility include magnesium halides such as magnesium chloride, magnesium bromide, magnesium iodide, and magnesium fluoride; alkoxy magnesium halides, such as magnesium methoxy chloride, magnesium ethoxy chloride, magnesium isopropoxy chloride, magnesium phenoxy chloride, and magnesium methylphenoxy chloride; alkoxy magnesiums, such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and/or magnesium carboxylates, such as magnesium laurate and magnesium stearate.

Non-reducible magnesium compounds may be compounds derived from the magnesium compounds having reducibility, or may be compounds derived at the time of preparing the catalyst component. The magnesium compounds having no reducibility may be derived from the compounds having reducibility by, for example, contacting the magnesium compounds having reducibility with polysiloxane compounds, halogen-containing silane compounds, halogen-containing aluminum compounds, esters, alcohols, and the like.

The magnesium compounds having reducibility and/or the magnesium compounds having no reducibility may be complexes of the above magnesium compounds with other metals, or mixtures thereof with other metal compounds. They may also be mixtures of two or more types of the above compounds. Further, halogen-containing magnesium compounds, including magnesium chloride, alkoxy magnesium chlorides and aryloxy magnesium chlorides may be used.

Supported Ziegler-Natta catalysts may be used in combination with a co-catalyst, also referred to herein as a Ziegler-Natta co-catalyst. Compounds containing at least one aluminum-carbon bond in the molecule may be utilized as the co-catalysts, also referred to herein as an organoaluminum co-catalyst. Suitable organoaluminum compounds include organoaluminum compounds of the general formula (II):

$$R^1_m Al(OR^2)_n H_p X_q, \tag{II}$$

wherein $R^1$ and $R^2$ are identical or different, and each represents a hydrocarbyl radical containing from 1 to 15 carbon atoms, or 1 to 4 carbon atoms; X represents a halogen atom; and m is 1, 2, or 3; n is 0, 1, or 2; p is 0, 1, 2, or 3; and q is 0, 1, or 2; and wherein m+n+p+q=3.

Other suitable organoaluminum compounds include complex alkylated compounds of metals of Group I (Periodic Table, lithium, etc.) and aluminum represented by the general formula (III):

$$M^1 Al R^1_4, \tag{III}$$

wherein $M^1$ is the Group I metal such as Li, Na, or K and $R^1$ is as defined in formula (II).

Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesquiethoxide and butyl aluminum sesqui-butoxide; partially alkoxylated alkyl aluminums having an average composition represented by the general formula $R^1_{2.5}Al(OR^2)_{0.5}$; partially halogenated alkyl aluminums, for example, alkyl aluminum dihalides such as ethyl aluminum dichloride, propyl aluminum dichloride and butyl aluminum dibromide; partially hydrogenated alkyl aluminums, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride, and ethyl aluminum ethoxybromide.

Electron donors are present with the metal components described above in forming the catalyst suitable for producing the linear polypropylenes described herein. Both "internal" and "external" electron donors are desirable for forming the catalyst suitable for making the linear polypropylene described herein. More particularly, the internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids.

More preferably, the one or more internal donors are non-aromatic. The non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof.

Even more preferably, the non-aromatic internal electron donor(s) comprises a $C_1$ to $C_{20}$ diester of a substituted or unsubstituted $C_2$ to $C_{10}$ dicarboxylic acid. The non-aromatic internal electron donor(s) may be one or more succinate compounds according to formula (IV):

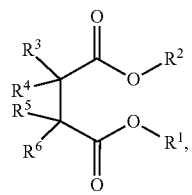

wherein $R^1$ and $R^2$ are independently $C_1$ to $C_{20}$ linear or branched alkyl, alkenyl, or cycloalkyl hydrocarbyl radicals; and $R^3$ to $R^6$ are independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, wherein at least two of the $R^3$ to $R^6$ radicals are joined to form a cyclic divalent radical, or a combination thereof.

The $R^3$ to $R^5$ groups of formula (IV) may be hydrogen and $R^6$ may be a radical selected from the group consisting of a primary branched, secondary or tertiary alkyl, or cycloalkyl radical having from 3 to 20 carbon atoms.

The internal donor may be a monosubstituted non-aromatic succinate compound. Suitable examples include diethyl-secbutylsuccinate, diethylhexylsuccinate, diethyl-cyclopropylsuccinate, diethyl-trimethylsilylsuccinate, diethyl-methoxysuccinate, diethyl-cyclohexylsuccinate, diethyl-(cyclohexylmethyl) succinate, diethyl-t-butylsuccinate, diethyl-isobutylsuccinate, diethyl-isopropylsuccinate, diethyl-neopentylsuccinate, diethyl-isopentylsuccinate, diethyl-(1,1,1-trifluoro-2-propyl) succinate, diisobutyl-sec-butylsuccinate, diisobutylhexylsuccinate, diisobutyl-cyclopropylsuccinate, diisobutyl-trimethylsilylsuccinate, diisobutyl-methoxysuccinate, diisobutyl-cyclohexylsuccinate, diisobutyl-(cyclohexylmethyl) succinate, diisobutyl-t-butylsuccinate, diisobutyl-isobutylsuccinate, diisobutyl-isopropylsuccinate, diisobutyl-neopentylsuccinate, diisobutyl-isopentylsuccinate, diisobutyl-(1,1,1-trifluoro-2-propyl) succinate, dineopentyl-sec-butylsuccinate, dineopentyl hexylsuccinate, dineopentyl cyclopropylsuccinate, dineopentyl trimethylsilylsuccinate, dineopentyl methoxysuccinate, dineopentyl cyclohexylsuccinate, dineopentyl (cyclohexylmethyl) succinate, dineopentyl t-butylsuccinate, dineopentyl isobutylsuccinate, dineopentyl isopropylsuccinate, dineopentyl neopentylsuccinate, dineopentyl isopentylsuccinate, and/or dineopentyl (1,1,1-trifluoro-2-propyl) succinate.

The internal electron donor having a structure consistent with formula (IV) may comprise at least two radicals from $R^3$ to $R^6$, which are different from hydrogen and are selected from $C_1$ to $C_{20}$ linear or branched alkyl, alkenyl, and/or cycloalkyl hydrocarbyl groups, which may contain heteroatoms. Two radicals different from hydrogen may be linked to the same carbon atom. Suitable examples include 2,2-disubstituted succinates including diethyl-2,2-dimethylsuccinate, diethyl-2-ethyl-2-methylsuccinate, diethyl-2-(cyclohexylmethyl)-2-isobutylsuccinate, diethyl-2-cyclopentyl-2-n-propylsuccinate, diethyl-2,2-diisobutylsuccinate, diethyl-2-cyclohexyl-2-ethylsuccinate, diethyl-2-isopropyl-2-methylsuccinate, diethyl-2,2-diisopropyl-diethyl-2-isobutyl-2-ethylsuccinate, diethyl-2-(1,1,1-trifluoro-2-propyl)-2-methylsuccinate, diethyl-2-isopentyl-2-isobutylsuccinate, diisobutyl-2,2-dimethylsuccinate, diisobutyl-2-ethyl-2-methylsuccinate, diisobutyl-2-(cyclohexylmethyl)-2-isobutylsuccinate, diisobutyl-2-cyclopentyl-2-n-propylsuccinate, diisobutyl-2,2-diisobutylsuccinate, diisobutyl-2-cyclohexyl-2-ethylsuccinate, diisobutyl-2-isopropyl-2-methylsuccinate, diisobutyl-2-isobutyl-2-ethylsuccinate, diisobutyl-2-(1,1,1-trifluoro-2-propyl)-2-methylsuccinate, diisobutyl-2-isopentyl-2-isobutylsuccinate, diisobutyl-2,2-diisopropylsuccinate, dineopentyl-2,2-dimethylsuccinate, dineopentyl-2-ethyl-2-methylsuccinate, dineopentyl-2-(cyclohexylmethyl)-2-isobutylsuccinate, dineopentyl-2-cyclopentyl-2-n-propylsuccinate, dineopentyl-2,2-diisobutylsuccinate, dineopentyl-2-cyclohexyl-2-ethylsuccinate, dineopentyl-2-isopropyl-2-methylsuccinate, dineopentyl-2-isobutyl-2-ethylsuccinate, dineopentyl-2-(1,1,1-trifluoro-2-propyl)-2-methylsuccinate, dineopentyl 2,2-diisopropylsuccinate, and/or dineopentyl 2-isopentyl-2-isobutylsuccinate.

The at least two radicals different from hydrogen may be linked to different carbon atoms between $R^3$ and $R^6$ in formula (IV). Examples include $R^3$ and $R^5$ or $R^4$ and $R^6$. Suitable non-aromatic succinate compounds such as this include: diethyl-2,3-bis(trimethylsilyl) succinate, diethyl-2,2-sec-butyl-3-methylsuccinate, diethyl-2-(3,3,3-trifluoropropyl)-3-methylsuccinate, diethyl-2,3-bis(2-ethylbutyl) succinate, diethyl-2,3-diethyl-2-isopropylsuccinate, diethyl-2,3-diisopropyl-2-methylsuccinate, diethyl-2,3-dicyclohexyl-2-methylsuccinate, diethyl-2,3-diisopropylsuccinate, diethyl-2,3-bis(cyclohexylmethyl) succinate, diethyl-2,3-di-t-butylsuccinate, diethyl-2,3-diisobutylsuccinate, diethyl-2,3-dineopentylsuccinate, diethyl-2,3-diisopentylsuccinate, diethyl-2,3-(1-trifluoromethyl-ethyl) succinate, diethyl-2-isopropyl-3-isobutylsuccinate, diethyl-2-t-butyl-3-isopropylsuccinate, diethyl-2-isopropyl-3-cyclohexylsuccinate, diethyl-2-isopentyl-3-cyclohexylsuccinate, diethyl-2-cyclohexyl-3-cyclopentylsuccinate, diethyl-2,2,3,3-tetramethylsuccinate, diethyl-2,2,3,3-tetraethylsuccinate, diethyl-2,2,3,3-tetrapropylsuccinate, diethyl-2,3-diethyl-2,3-diisopropylsuccinate, diisobutyl-2,3-bis(trimethylsilyl) succinate, diisobutyl-2,2-sec-butyl-3-methylsuccinate, diisobutyl-2-(3,3,3-trifluoropropyl)-3-methylsuccinate, diisobutyl-2,3-bis(2-ethylbutyl) succinate, diisobutyl-2,3-diethyl-2 isopropylsuccinate, diisobutyl-2,3-diisopropyl-2-methylsuccinate, diisobutyl-2,3-dicyclohexyl-2-methylsuccinate, diisobutyl-2,3-diisopropylsuccinate, diisobutyl-2,3-bis (cyclohexylmethyl) succinate, diisobutyl-2,3-di-t-butylsuccinate, diisobutyl-2,3-diisobutylsuccinate, diisobutyl-2,3-dineopentylsuccinate, diisobutyl-2,3-diisopentylsuccinate, diisobutyl-2,3-(1,1,1-trifluoro-2-propyl) succinate, diisobutyl-2,3-n-propylsuccinate, diisobutyl-2-isopropyl-3-isobutylsuccinate, diisobutyl-2-terbutyl-3-isopropylsuccinate, diisobutyl-2-isopropyl-3-cyclohexylsuccinate, diisobutyl-2-isopentyl-3-cyclohexylsuccinate, diisobutyl-2-n-propyl-3-(cyclohexylmethyl) succinate, diisobutyl-2-cyclohexyl-3-cyclopentylsuccinate, diisobutyl-2,2,3,3-tetramethylsuccinate, diisobutyl-2,2,3,3-tetraethylsuccinate, diisobutyl-2,2,3,3-tetrapropylsuccinate, diisobutyl-2,3-diethyl-2,3-diisopropylsuccinate, dineopentyl-2,3-bis(trimethylsilyl) succinate, dineopentyl-2,2-di-sec-butyl-3-methylsuccinate, dineopentyl 2-(3,3,3-trifluoropropyl)-3-methylsuccinate, dineopentyl-2,3-bis(2-ethylbutyl) succinate, dineopentyl 2,3-diethyl-2-isopropylsuccinate, dineopentyl-2,3-diisopropyl-2-methylsuccinate, dineopentyl-2,3-dicyclohexyl-2-methylsuccinate, dineopentyl-2,3-diisopropylsuccinate, dineopentyl-2,3-bis(cyclohexylmethyl) succinate, dineopentyl-2,3-di-t-butylsuccinate, dineopentyl-2,3-diisobutylsuccinate, dineopentyl-2,3-dineopentylsuccinate, dineopentyl-2,3-diisopentylsuccinate, dineopentyl 2,3-(1,1,1-trifluoro-2propyl) succinate, dineopentyl-2,3-n-propylsuccinate, dineopentyl-2-isopropyl-3-isobutylsuccinate, dineopentyl-2-t-butyl-3-isopropylsuccinate, dineopentyl-2-isopropyl-3-cyclohexylsuccinate, dineopentyl-2-isopentyl-3-cyclohexylsuccinate, dineopentyl-2-n-propyl-3-(cyclohexylmethyl) succinate, dineopentyl 2-cyclohexyl-3-cyclopentylsuccinate, dineopentyl-2,2,3,3-tetramethylsuccinate, dineopentyl 2,2,3,3-tetraethylsuccinate, dineopentyl-2,2,3,3-tetrapropylsuccinate, and/or dineopentyl-2,3-di ethyl-2,3-diisopropylsuccinate.

The electron donor according to formula (IV) may include two or four of the radicals $R^3$ to $R^6$ joined to the same carbon atom which are linked together to form a cyclic multivalent radical. Examples of suitable compounds include 1-(ethoxycarbonyl)-1-(ethoxyacetyl)-2,6-dimethylcyclohexane, 1-(ethoxycarbonyl)-1-(ethoxyacetyl)-2,5-dimethyl-cyclopentane, 1-(ethoxycarbonyl)-1-(ethoxyacetylmethyl)-2-methylcyclohexane, and/or 1-(ethoxycarbonyl)-1-(ethoxy (cyclohexyl) acetyl) cyclohexane.

Preferably, the internal electron donor may be selected from the group consisting of diethyl-2,3-diisopropylsuccinate, diisobutyl-2,3-diisopropylsuccinate, di-n-butyl-2,3-diisopropylsuccinate, diethyl-2,3-dicyclohexyl-2-methylsuccinate, diisobutyl-2,3-dicyclohexyl-2-methylsuccinate, diisobutyl-2,2-dimethylsuccinate, diethyl-2,2-dimethylsuccinate, diethyl-2-ethyl-2-methylsuccinate, diisobutyl-2-ethyl-2-methylsuccinate, diethyl-2-(cyclohexylmethyl)-3-ethyl-3-methylsuccinate, diisobutyl-2-(cyclohexylmethyl)-3-ethyl-3-methylsuccinate, and combinations thereof.

In conjunction with an internal donor, two or more external electron donors may also use in combination with a catalyst. The external electron donors may comprise an organic silicon compound of the general formula (V):

$$R^1_n Si(OR^2)_{4-n},\quad\quad\quad\quad (V)$$

wherein $R^1$ and $R^2$ independently represent a hydrocarbyl radical and n is 1, 2, or 3.

Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyl-dimethoxysilane, cyclohexylmethyldiethoxysilane, ethyltrimethoxysilane, ethyltriethoxysilane, vinyl-trimethoxysilane, methyltrimethoxysilane, n-propyltriethoxysilane, decyltrimethoxysilane, decyltriethoxysilane, phenyltrimethoxysilane, [gamma]-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbomanetriethoxysilane, 2-norbomanemethyldimethoxysilane, ethyl silicate, butyl silicate, trimethyl-phenoxysilane, methylallyloxysilane, vinyltris (beta-methoxyethoxysilane), vinyltriacetoxysilane, and/or dimethyltetraethoxydisiloxane.

Suitable examples of the organic silicon compounds in which n is 0, 1, or 3 include trimethylmethoxysilane, trimethylethoxysilane, methyl-phenyldimethoxysilane, methyltrimethoxysilane, t-butyl-methyldimethoxysilane, t-butylmethyldiethoxysilane, t-amylmethyldimethoxysilane, phenylmethyldimethoxysilane, cyclohexylmethyldimethoxysilane, cyclohexylmethyldiethoxysilane, ethyltrimethoxysilane, ethyltriethoxysilane, vinyltriethoxysilane, methyltrimethoxysilane, methyltriethoxysilane, propyltrimethoxysilane, decyl-trimethoxysilane, decyltriethoxysilane, phenyltrimethoxysilane, propyltriethoxysilane, butyltriethoxysilane, phenyltriethoxysilane, vinyltrimethoxysilane, vinyltributoxysilane, cyclohexyltrimethoxysilane, 2-norbomanetrimethoxysilane, and/or 2-norbomanetriethoxysilane.

Preferably the external electron donors are selected from any one or more of methyltrimethoxysilane, ethyltrimethoxysilane, ethyltriethoxysilane, vinyltriethoxysilane, propyltrimethoxysilane, decyltrimethoxysilane, decyltriethoxysilane, propyltriethoxysilane, butyltriethoxysilane, phenyltriethoxysilane, vinyltrimethoxysilane, vinyltributoxysilane and/or cyclohexyltrimethoxysilane.

The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower melt flow rates (MFR's), as a consequence of a reduced hydrogen response during polymerization. The stereoregulating capability and hydrogen response of a given external electron donor are typically directly and inversely related.

The above disclosed organic silicon compounds may be used such that a compound capable of being changed into such an organic silicon compound is added at the time of polymerizing or preliminarily polymerizing an olefin, and the organic silicon compound may be formed in situ during the polymerization or the preliminary polymerization of the olefin.

In any embodiment, the production of the linear polypropylene may include the use of two external electron donors. The two external electron donors may be selected from any of the external electron donors described herein. But in a particular embodiment, the first external electron donor has the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3{}_nSi(OR^4)_{4-n}$, wherein each $R^3$ and $R^4$ are independently a hydrocarbyl radical comprising from 1 to 10 carbon atoms, and n is 1, 2, or 3; wherein the second external electron donor is different than the first external electron donor.

In any embodiment, the first external electron donor and the second external electron donor may be selected from the group consisting of tetraethoxysilane, methylcyclohexyldimethoxysilane, propyltriethoxysilane, dicyclopentydimethoxysilane, and combinations thereof. The Ziegler-Natta catalyst system may comprise 2.5 mol % to less than 50 mol % of the first external electron donor and greater than 50 mol % of a second external electron donor based on total mol % of external electron donors.

In any embodiment, the method to make a linear polypropylene comprises contacting propylene monomers (and optionally comonomers) at propylene polymerization conditions such as described herein with a catalyst system to produce a linear polypropylene comprising at least 94.0, or 96.0, or 98.0, or 99.0, or 99.2, or 99.6, or 99.8 or 100 wt % propylene-derived units by weight of the linear polypropylene, an Mw/Mn greater than 5 (or as described herein) and a Melt Strength of at least 10 cN determined using an extensional rheometer at 190° C. (described further below), wherein any co-monomers may be selected from ethylene, butene, hexene, octene, and combinations thereof.

The polymerization process may include a preliminary polymerization step. The preliminary polymerization may include utilizing the Ziegler-Natta catalyst system comprising the non-aromatic internal electron donor in combination with at least a portion of the organoaluminum co-catalyst wherein at least a portion of the external electron donors are present wherein the catalyst system is utilized in a higher concentration than utilized in the subsequent "main" polymerization process.

The concentration of the catalyst system in the main and/or preliminary polymerization stages may be from 0.01 to 200 millimoles, or more preferably from 0.05 to 100 millimoles, calculated as a titanium atom, per liter of an inert hydrocarbon medium. The organoaluminum co-catalyst may be present in an amount sufficient to produce from 0.1 to 500 g, or more preferably from 0.3 to 300 g, of a polymer per gram of the titanium catalyst present, and may be present at from 0.1 to 100 moles, or more preferably from 0.5 to 50 moles, per mole of the titanium atom present in the catalyst component.

The preliminary polymerization, if carried out, may be performed under mild conditions in an inert hydrocarbon medium in which an olefin and the catalyst components are present. Examples of the inert hydrocarbon medium used include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures thereof. Such inert hydrocarbons can be used in the main polymerization process as well. Also, the olefin(s) used in the preliminary polymerization may be the same as an olefin to be used in the main polymerization. The reaction temperature for the preliminary polymerization may be a point at which the resulting preliminary polymerization does not dissolve substantially in the inert hydrocarbon medium, which may be from −20 to +100° C., or from −20 to +80° C., or from 0 to 40° C.

During the preliminary polymerization, a molecular weight controlling agent such as hydrogen may be used. The molecular weight controlling agent may desirably be used in such an amount that the polymer obtained by preliminary polymerization has properties consistent with the intended product. The preliminary polymerization may be carried out so that from 0.1 to 1000 g, or more preferably from 0.3 to 300 g, of a polymer forms per gram of the titanium catalyst.

The main polymerization of the propylene and optional comonomers may be carried out in the gaseous phase, the liquid phase, bulk phase, slurry phase, or any combination thereof. In particular, polymerization may be carried out by slurry polymerization wherein the inert hydrocarbon may be used as a reaction solvent, or an olefin liquid under the reaction conditions may be used as the solvent. The polymerization process includes contacting the titanium catalyst component, the one or more internal electron donor, the organoaluminum co-catalyst, and the two external electron donors with each other at the time of the main polymerization, before the main polymerization, for example, at the time of the preliminary polymerization, or a combination thereof. In contacting them before the main polymerization, any two or more of these components may be freely selected and contacted. Two or more of the components may be contacted individually or partly and then contacted with each other in total to produce the catalyst system. In any case, hydrogen may be used during polymerization to control the molecular weight and other properties of the resulting polymer.

In any embodiment, the polymerization conditions include a polymerization temperature within a range from 20, or 40, or 60° C. to 120, or 140, or 160, or 180, or 200° C., and a pressure from atmospheric pressure up to 100 kg/cm², or more preferably within a range from 2, or 6 kg/cm² to 20, or 50, or 100 kg/cm². The polymerization process may be carried out batch-wise, semi-continuously, or continuously, and/or in two or more reactors in series. The conditions in each reactor if carried out in more than one reactor may be the same or different. The reaction slurry (homopolymer granules in bulk propylene) may then be removed from the reactor and the polymer granules continuously separated from the liquid propylene. The polymer granules may then be separated from the unreacted monomer to produce a granular product for compounding and/or mechanical properties.

In any case, the linear polypropylene has desirable properties as described herein. The melt flow rate (MFR) of the linear polypropylene in any embodiment is within a range from 0.1, or 0.2, or 0.5 g/10 min to 4, or 8, or 10, or 20 g/10 min. In any embodiment, the weight average molecular weight (Mw) by GPC-3D analysis of the linear polypropylene is within a range of from 100,000 or 150,000 or 200,000 or 250,000 g/mole to 500,000 or 550,000 or 600,000 or 800,000 g/mole. In any embodiment the linear polypropylene has a molecular weight distribution (Mw/Mn) of at least 5 or 6, or 8, or within a range of from 5 or 6 or 8 to 9 or 10 or 12 or 16. In any embodiment, the z-average molecular weight (Mz) by GPC-3D analysis of the desirable linear polypropylenes useful in the invention is within a range of from 800,000 or 1,000,000 or 1,100,000 g/mole to 1,300,000 or 1,400,000 or 1,500,000 or 1,800,000 or 2,000,000 g/mole, and the ratio of the z-average molecular weight and the weight average molecular weight (Mz/Mw) is greater than 2.8, or 2.9, or 3.0, or within a range of from 2.8 or 2.9 or 3.0 or 3.5 to 4.0 or 4.5 or 5.0, the values greater than 2.8 indicating a high-molecular weight portion to the linear polyethylene.

Useful linear polypropylenes may have other desirable properties. In any embodiment, the linear polypropylene has a tensile at yield (ASTM D638, with a crosshead speed of 50.8 mm/min (2.0 in/min), and a gauge length of 50.8 mm (2.0 in), using an Instron Machine) within a range of from 20 or 25 or 30 or 25 MPa to 40 or 45 or 50 or 55 or 80 MPa. In any embodiment, the linear polypropylene has a 1% secant flexural modulus (ASTM D790A, using a crosshead speed of 1.27 mm/min (0.05 in/min), and a support span of 50.8 mm (2.0 in) using an Instron machine) within a range of from 1,800 or 1,900 or 2,000 MPa to 2,100 or 2,200 or 2,400 or 2,600 MPa. In any embodiment, the linear polypropylene has a melt strength of at least 10, or 15 or 20 cN, or within a range of from 10 or 15, or 20 or 30 cN to 35, or 40 cN at 190° C. (determined by extensional rheology, described below). In any embodiment, the melt strength of the branched polypropylene described below is greater than the melt strength of the linear polypropylene, preferably by at least 5, or 10, or 15, or 20 cN.

Branched Polypropylene

Here and throughout the specification the term "branched polypropylene" refers to a polypropylene homopolymer or copolymer having a branching index g'(vis) of 0.98, or 0.97, or 0.96 or less. The branched polypropylene can be formed by any means such as by catalyst production to form a reactor grade branched polypropylene, or reactive extrusion, among other means. The preferred branched polypropylene may have other features as further described below.

In any embodiment the branched polypropylene is formed by combining under suitable conditions the linear polypropylene and an organic peroxide, wherein the "organic peroxide" is any organic compound comprising at least one —(O)COO— group and/or —O—O— group, and preferably possesses a 1 hour half-life temperature ($^1T_{1/2}$) of less than 100° C. determined in an aromatic and/or halogenated aromatic hydrocarbon solvent, preferably a ($^1T_{1/2}$) within a range from 25, or 35, or 45° C. to 65, or 75, or 85, or 100° C.

In any embodiment, the organic peroxide is selected from compounds having one or more structures selected from (a) and (b):

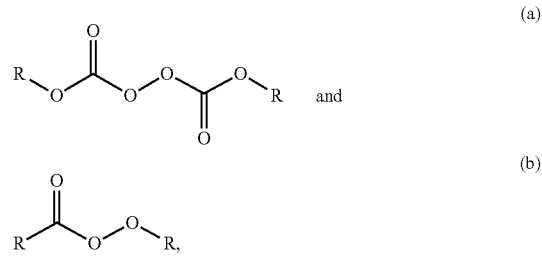

wherein each "R" group is independently selected from the group consisting of hydrogen, C1 or C5 to C24 or C30 linear alkyls, C1 or C5 to C24 or C30 secondary alkyls, C1 or C5 to C24 or C30 tertiary alkyls, C7 to C34 alkylaryls, C7 to C34 arylalkyls, and substituted versions thereof. Most preferably, the organic peroxide is selected from the structures represented by formula (a). By "substituted" what is meant are hydrocarbon "R" groups having substituents such as halogens, carboxylates, hydroxyl groups, amines, mercaptans, and phosphorous containing groups. In a particular embodiment, each "R" group is independently selected from C8 to C20 or C24 linear, secondary, or tertiary alkyls, such as octyl, decyl, lauryl, myristyl, cetyl, arachidyl, behenyl, erucyl and ceryl groups and linear, secondary or tertiary versions thereof. Specific, non-limiting examples of suitable organic peroxides include di-sec-butyl peroxydicarbonate, diisopropyl peroxydicarbonate, dicyclohexyl peroxydicarbonate, di(4-tert-butylcyclohexyl) peroxydicarbonate, dicetyl peroxydicarbonate, dibutyl peroxydicarbonate, di(2-ethylhexyl) peroxydicarbonate, didodecyl peroxydicarbonate, diicosyl peroxydicarbonate, and ditetracosyl peroxydicarbonate.

The formation of the branched polypropylenes described herein are effected in any embodiment by melt blending the linear polypropylene with the organic peroxide, especially through shear forces and applied radiative heating during blending/extrusion, to a melt temperature of at least the melting point of the linear polypropylene, such as at least 140, or 150, or 160° C., or within a range from 140, or 150, or 160° C. to 180, or 200, or 220, or 240, or 260, or 280, or 300° C. Suitable means include a single or twin screw extruder or Brabender-type apparatus. Most preferably, within a range from 0.1, or 0.5, or 1 wt % to 2, or 3, or 4, or 5 wt % of the organic peroxide is combined with the linear polypropylene, by weight of the organic peroxide and linear polypropylene.

In any embodiment the branched polypropylenes, directly from the extrusion process, is formed into reactor flakes and/or granules, or extruded pellets without being treated under vacuum and/or solvent washing.

In any embodiment it is preferable that the peroxide melts before it reacts with the linear polypropylene so that the granules get evenly coated and the high specific surface area is utilized prior to the branching and/or cross-linking reactions. In any embodiment, reactor granules of the linear polypropylene used herein are preferred over extruded pellets. Such linear polypropylene granules are preferably dry blended with the organic peroxide before "combining" as by, for example, melt blending in a single or twin screw extruder ("melt extrusion").

In any embodiment, the product of the reaction between the organic peroxide and linear polypropylene may include decomposition products consisting of carbon dioxide and alcohol, preferably C8 to C24 alcohols, and most preferably an alcohol that is the hydroxylated equivalent of the organic peroxide use in the reaction. The alcohol is typically present, if at all, at a level of less than 2, or 1, or 0.5 wt % by weight of the branched polypropylenes. Described in this way, the branched polypropylene may have any of the properties described herein for the composition.

Thus formed, the branched polypropylenes described herein are ready to ship, transport, and/or store without further treatment, and be used in blending with the low molecular weight polyolefin to make any number of articles, both foamed and non-foamed. In any embodiment, a foaming agent may be added during the heating/extrusion process described above such that the agent is not activated until after shipping and ready to form into a foamed article. Preferably, the low molecular weight polyolefin is also blended with the branched polypropylene prior to foaming. As mentioned, the composition may be later heated/extruded again to form articles and effect foaming, if so desired.

The branched polypropylene will have the same level of propylene and comonomer derived units as its precursor linear polypropylene. In any embodiment, diene monomers (linear, branched or cyclic C4 to C20 alkenes having at least two conjugated or non-conjugated carbon-carbon double bonds) such as butadiene, isoprene, norbornenes, and 1,9-decadiene are absent from the branched polypropylene and/or all process steps in forming the branched polypropylene. The polypropylene useful in the inventive compositions can be characterized by any number of parameters as distinct from its linear polypropylene precursor. In any embodiment, the branched polypropylene has a melt strength of at least 20, or 30, or 40 cN, or within a range from 20, or 30, or 40, or 45 cN to 60, or 65, or 80 cN.

In any embodiment, the branched polypropylene has a MFR within a range from 0.1, or 0.2, or 0.5 g/10 min to 4, or 8, or 10, or 20 g/10 min.

In any embodiment the branched polypropylenes have a number average molecular weight (Mn), by GPC-3D analysis, within a range from 18,000, or 20,000, or 24,000, or 28,000 g/mole to 40,000, or 44,000, or 48,000, or 50,000 g/mole. Also in any embodiment the polypropylenes have a weight average molecular weight (Mw), by GPC-4D analysis within a range from 250,000, or 300,000 or 350,000 g/mole to 450,000, or 500,000, or 550,000 or 600,000 g/mole. Also in any embodiment, the branched polypropylenes have a z-average molecular weight (Mz), by GPC-4D analysis within a range from 1,000,000, or 1,100,000, or 1,200,000 g/mole to 1,500,000, or 1,600,000, or 1,700,000, or 1,800,000 g/mole. As an indicator of its high molecular weight component or "tail", the branched polypropylenes has in any embodiment an Mz/Mw value of greater than 3.0, or 3.2, or 3.6, or within a range from 3.0, or 3.2, or 3.6 to 4.0 or 4.5 or 5.0 or 6.0. Also, the branched polypropylenes have an Mz/Mn of greater than 30 or 35 or 40, or within a range from 30, or 35, or 40 to 44, or 48, or 50, or 55, or 60. Also, the branched polypropylene as in any embodiment an Mw/Mn of at least 5, or 6 or 8, or 10, or within a range from 5, or 6, or 8, or 10 to 16, or 18 or 20.

The branched polypropylenes have improved strain hardening (relative to the linear polypropylene) as evidenced in the increased Peak Extensional Viscosity. In any embodiment, the branched polypropylenes have a Peak Extensional Viscosity (annealed) of greater than 50, or 55, or 60 kPa*s, or within a range from 50, or 55, or 60 kPa*s to 500, or 550, or 600 kPa*s at a strain rate of 0.01/sec (190° C.). In any embodiment, the branched polypropylenes have a Peak Extensional Viscosity (annealed) of greater than 500, or 550, or 600 kPa*s, or within a range from 500, or 550, or 600 kPa*s to 2,000, or 2,500, or 3,000 kPa*s at a strain rate of 0.01/sec (190° C.).

Polypropylene Composition

Disclosed in any embodiment is the polypropylene composition comprising (or consisting essentially of) the branched polypropylene such as described above and a low molecular weight polyolefin. In any embodiment, the composition comprises within a range from 5, or 10 wt % to 15, or 20, or 25, or 30, or 35, or 40 wt % of the low molecular weight polyolefin by weight of the low molecular weight polyolefin and branched polypropylene. Most preferably, the remainder of the composition is the branched polypropylene and additives.

In any embodiment, the polypropylene composition exhibits at least 90%, or 95% of the strain hardening that is exhibited by the branched polypropylene alone as measured by extensional rheology at 190° C. at the same strain rate. Also in any embodiment, the polypropylene composition exhibits at least 10%, or 5% lower complex viscosity at 500 rad/sec compared to the branched polypropylene alone as determined by small-amplitude oscillatory spectroscopy at 190° C. In any embodiment, the composition may be formed into a foamed, thermoformed, and/or extruded article. Desirable articles include cups, plates, food containers, and insulation containers.

The "low molecular weight polyolefin" is a polyolefin polymer having a weight average molecular weight of no more than 80,000, or 100,000 g/mole, preferably comprising ethylene and C4 to C10 derived units, most preferably comprising propylene and optionally ethylene derived units. In any embodiment, the low molecular weight polyolefin has a melt flow rate (230° C./2.16 kg) of at least 50, or 100, or 200, or 500 g/10 min, or within a range from 50, or 100, or 200, or 500 g/10 min to 1,500, or 2,000, or 5,000 g/10 min.

In any embodiment, the low molecular weight polyolefin is selected from the group consisting of polypropylene homopolymers, polypropylene copolymers, polyethylene homopolymers, polyethylene copolymers, and blends thereof. Most preferably, the low molecular weight polyolefin is a polypropylene homopolymer, meaning that it comprises less than 1, or 2 wt % wt % ethylene or C4 to C10 derived units.

In any embodiment, the low molecular weight polyolefin has an Mw/Mn of less than 5, or 4, or 3.

The compositions are suitable for thermoformed articles, and especially foamed articles since they are more processable than the branched polypropylene alone, but maintain a desirable level of strain hardening for forming closed cell structures Thus in any embodiment, is a foamed, thermoformed, and/or extruded article comprising a polypropylene composition comprising within a range from 95 to 60 wt %, by weight of the branched polypropylene and polypropylene homopolymer, of a branched polypropylene and a minor amount of additives having a melt strength within a range from 20 to 80 cN (190° C.), and a melt flow rate within a range of 0.1 to 20 g/10 min; and within a range from 5 to 40 wt %, by weight of the branched polypropylene and polypropylene homopolymer, of a polypropylene homopolymer having a melt flow rate of at least 50 g/10 min; wherein the polypropylene composition as a melt flow rate within a range from 0.5 to 40 g/10 min, a melt strength within a range from 20 to 80 cN (190° C.), and exhibits at least 90% the strain hardening that is exhibited by the branched polypropylene.

Most any blending technique can be used to combine the components and produce the polypropylene composition. Desirably, the inventive process comprises combining a linear polypropylene with an organic peroxide to obtain a branched polypropylene; combining the branched polypropylene with a low molecular weight polyolefin to obtain a polypropylene composition. Desirably, within a range from 5, or 10 wt % to 15, or 20, or 25, or 30, or 35, or 40 wt % of the low molecular weight polyolefin by weight of the low molecular weight polyolefin and branched polypropylene is combined. The remainder is the branched polypropylene with or without additives such as antioxidants, fillers, and other additives known in the art. The components are most preferably melt blended using a single or double screw extruder operating at temperatures that melt the polymeric ingredients but lower than their decomposition temperature, preferably within a range from 190 to 260° C.

In any embodiment, the low molecular weight polyolefin is combined with the other ingredients by directly feeding to an extruder, preferably in its solid form, or first forming a masterblend of the low molecular weight polyolefin with a higher molecular weight polyolefin.

In any embodiment, is a process to produce a polypropylene composition comprising combining a linear polypropylene having a melt strength within a range from 10 to 40 cN (190° C.) with an organic peroxide to obtain a branched polypropylene having a melt strength within a range from 20 to 80 cN (190° C.), wherein the melt strength of the branched polypropylene is greater than the melt strength of the linear polypropylene; and combining the branched polypropylene having a melt flow rate within a range of 0.1 to 20 g/10 min and an Mw/Mn of at least 5 with within a range from 5 to 40 wt %, by weight of the branched polypropylene and polypropylene homopolymer, of a polypropylene homopolymer having a melt flow rate of at least 50 g/10 min and an Mw/Mn of less than 5 to obtain a polypropylene composition; wherein the polypropylene composition as a melt flow rate within a range from 0.5 to 40 g/10 min, a melt strength within a range from 20 to 80 cN (190° C.), and exhibits at least 90% the strain hardening that is exhibited by the branched polypropylene.

The various descriptive elements and numerical ranges disclosed herein for the inventive polypropylene compositions and process to obtain them can be combined with other descriptive elements and numerical ranges to describe the invention(s); further, for a given element, any upper numerical limit can be combined with any lower numerical limit described herein, including the examples in jurisdictions that allow such combinations.

EXAMPLES

The features of the inventions are demonstrated in the following non-limiting examples. First, test methods and experimental procedures are described.

MFR. ASTM D1238 at 230° C. with 2.16 kg load.

Molecular Weight Determinations using DRI (GPC-3D). This method describes the first of two different methods that were used to determine the moments of molecular weight of the polymer described herein, as indicated, the so-called "GPC-3D" method and the "GPC-4D" method, each based on Gel Permeation Chromatography (GPC) but using different detection methods. In the GPC-3D method, the number average molecular weight (Mn) values were determined by using a High Temperature Gel Permeation Chromatography (Agilent PL-220), equipped with three in-line detectors, a differential refractive index detector (DRI), a light scattering (LS) detector, and a viscometer. Three Agilent PLgel 10 μm Mixed-B LS columns were used. The nominal flow rate is 0.5 mL/min, and the nominal injection volume is 300 μL. The various transfer lines, columns, viscometer and differential refractometer (the DRI detector) were contained in an oven maintained at 145° C. Solvent for the experiment is prepared by dissolving 6 grams of butylated hydroxytoluene (BHT) as an antioxidant in 4 liters of Aldrich reagent grade 1,2,4-trichlorobenzene (TCB). The TCB mixture is then filtered through a 0.1 m Teflon filter. The TCB is then degassed with an online degasser before entering the GPC-3D. Polymer solutions were prepared by placing dry polymer in a glass container, adding the desired amount of TCB, then heating the mixture at 160° C. with continuous shaking for about 2 hours. All quantities were measured gravimetrically. The TCB densities used to express the polymer concentration in mass/volume units were 1.463 g/ml at 23° C. and 1.284 g/ml at 145° C. The injection concentration is from 0.5 to 2.0 mg/ml, with lower concentrations being used for higher molecular weight samples. Prior to running each sample the DRI detector and the viscometer were purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration "c" at each point in the chromatogram is calculated from the baseline-subtracted DRI signal, $I_{DRI}$, using the equation:

$$c = (K_{DRI} I_{DRI})/(dn/dc),$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in $g/cm^3$, molecular weight is expressed in g/mole, and intrinsic viscosity is expressed in dL/g.

All the concentration is expressed in $g/cm^3$, molecular weight is expressed in g/mole, and intrinsic viscosity is expressed in dL/g unless otherwise noted. For data processing either GPC-3D or -4D, the Mark-Houwink constants used were K=0.000229 and a=0.705, and dn/dc=0.1048 mL/mg. The A2 (input value)=0.0006.

Molecular Weight Determination using IR Detectors (GPC-4D). The distribution and the moments of weight average and z-average molecular weights (Mw, Mz) were determined using GPC-4D were determined using much similar methods as when done by GPC-3D, using a high temperature GPC (Polymer Char GPC-IR) equipped with a multiple-channel band-filter based Infrared detector IR5, an 18-angle light scattering detector and a viscometer. Three Agilent PLgel 10 m Mixed-B LS columns were used to provide polymer separation. Aldrich reagent grade TCB with 300 ppm antioxidant BHT was used as the mobile phase. The TCB mixture is filtered through a 0.1 m Teflon filter and degassed with an online degasser before entering the GPC instrument. The nominal flow rate is 1.0 mL/min and the nominal injection volume is 200 μL. The whole system including transfer lines, columns, detectors were contained in an oven maintained at 145° C. Given amount of polymer sample is weighed and sealed in a standard vial with 80 μL flow marker (heptane) added to it. After loading the vial in the autosampler, polymer is automatically dissolved in the instrument with 8 mL added TCB solvent. The polymer is dissolved at 160° C. with continuous shaking for about 2 hours. The TCB densities used in concentration calculation were 1.463 g/ml at 23° C. and 1.284 g/ml at 145° C. The sample solution concentration is from 0.2 to 2.0 mg/ml, with lower concentrations being used for higher molecular weight samples.

The concentration "c" at each point in the chromatogram is calculated from the baseline-subtracted IR5 broadband signal intensity "I" using the following equation:

$$c = \beta I,$$

where β is the mass constant determined with polypropylene standards. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 g/mole to 10,000,000 g/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stands for polystyrene while those without a subscript are for the test samples. In this method, $a_{PS}=0.67$ and $K_{PS}=0.000175$, while "K" and "a" are 0.000229 and 0.705 for polypropylene as used herein. In all cases, both GPC-3D and GPC-4D, values for Mn, Mw and Mz have an accuracy of ±10%.

Branching Index

A high temperature Viscotek Corporation viscometer, equipped with four capillaries arranged in a Wheatstone bridge configuration with two pressure transducers, was used to determine specific viscosity of the eluting polymer from the GPC described above. One transducer measures the total pressure drop across the detector, and the other, positioned between the two sides of the bridge, measures a differential pressure. The specific viscosity, $\eta_S$, for the solution flowing through the viscometer was calculated from their outputs. The intrinsic viscosity, [η], at each point in a chromatogram was calculated from the following equation:

$$\eta_S = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample was calculated by:

$$[\eta]_{avg} = \frac{\Sigma c_i [\eta]_i}{\Sigma c_i}$$

where the summations are over the chromatographic slices, i, between the integration limits.

The branching index g'(vis) is then defined as:

$$g'(vis) = \frac{[\eta]_{avg}}{k M_v^\alpha}$$

where $M_V$ is the viscosity-average molecular weight based on molecular weights determined by LS laser analysis. The Z average branching index ($g'z_{ave}$) is calculated using Ci=polymer concentration in the slice i in the polymer peak times the mass of the slice squared, $Mi^2$. Values of g'(vis) approaching 1 indicate a linear polymer, and lower values indicate some level of branching that increases with decreasing g'(vis) value.

SAOS. The Small Angle Oscillatory Spectroscopy method was used to determine viscosity at low shear rates. Polymer samples were prepared using hot press (either a Carver Press or Wabash Press) to make disks of 25 mm in diameter and 2.5 mm in thickness. In order to characterize the shear thinning behavior, a rheometer ARES-G2 (TA Instruments) was used to conduct small angle oscillatory shear measurements at angular frequency ranging from 0.01 to 500 rad/s at temperature 190° C. and at a fixed strain of 10%. The data was then converted into viscosity as a function of shear rate. To ensure that selected strain provides measurements within linear deformation range, the strain sweep measurements have been conducted (at angular frequency of 100 Hz). Data was processed using Trios software.

Extensional Rheology. To characterize strain hardening behavior of the polypropylene, the annealed samples were tested using a DHR-3 rheometer (TA Instruments) with mounted SER fixture to measure stress in extension. The samples were prepared using procedure described above (SAOS) and later cut into a rectangular shape with dimensions near 18 mm long and 12.7 mm wide. The measurements were conducted at Hencky strain rates of 1, 5, and 10 $s^{-1}$ at a temperature of 190° C. Data was processed using Trios software. Samples were annealed by heated to around 200° C. for 3 min to melt the polypropylene pellets without pressure. Then 1500 psi pressure was applied while the sample was kept heated for another 3 min between two plates. Afterwards, the pressure applied to sample was removed while the sample was kept heated at 200° C. for another 20 min. After 20 min, the sample was cooled down with water circulation without any pressure applied for additional 20 min. The values of melt strength reported herein have an accuracy of +10%.

Procedure for Blending Components. The components listed in Table 1 were melt blended using a ZSK 30 mm extruder to produce each Example blend, where 15 to 50 wt % (based on the weight of all components of the blend) of a low molecular weight polyolefin, in this case a 1550 MFR polypropylene homopolymer, was pre-blended with 50 to 85 wt % of a branched polypropylene in a Patterson Double Cone Blender. The dry blend was fed into a Coperion Werner and Pfleiderer ZSK 30 mm extruder (twin co-rotating screws, L/D=36) with an output about 10 kg/h and nitrogen applied to the hopper. The extruder torque was about 50%, die pressure about 400 psi, and the screw speed about 200 rpm. The melt temperature was about 435° F. (222° C.). Finally, an underwater pelletizer was used to produce pellets of each of the Example blends.

The branched polypropylene (b-PP) was produced by melt extruding a Ziegler-Natta produced linear polypropylene homopolymer made as described above with 1.5 wt % Perkadox (Akzo Nobel) at a temperature within a range from 190 to 220° C. In all the exemplary blends, the b-PP has a g'(vis) of less than 0.98, a melt strength of 40±5 cN, an MFR of 2.09 g/10 min, an Mw/Mn of 15, and an Mz/Mw of 6.

In all blends, the low molecular weight polyolefin (LMW-PO) was a polypropylene homopolymer (100 wt % propylene-derived units) with an MFR of 1550 g/10 min, and an Mw/Mn of 2.5 (GPC-3D).

Summary of the inventive polypropylene compositions in Table 1:

Example 1 is an 85:15 blend of the branched polypropylene (a polypropylene homopolymer, 100 wt % propylene-derived units) and the LMW-PO, the blend had a melt strength of 17.5 cN with a draw ratio near 5.

Example 2 is a 50:50 blend of a branched polypropylene (100 wt % propylene-derived units) and was blended by a third party compounder, PolyOne; the blend had a melt strength of 2.5 cN with a draw ratio close to 12.

Example 3 is a 50:50 blend but the branched polypropylene has about 0.55 wt % ethylene derived units or less by weight of the polymer.

Example 4 is a 50:50 blend but the branched polypropylene is a polypropylene homopolymer with 100 wt % propylene-derived units.

TABLE 1

Polypropylene Compositions

| Example | b-PP:LMW-PO | MFR, g/10 min | GPC method | Mn, g/mole | Mw, g/mole | Mw/Mn | Mz/Mw |
|---|---|---|---|---|---|---|---|
| b-PP | 100:0 | 2.09 | 4D | 30,000 | 460,000 | 15.2 | 6.0 |
| 1 | 85:15 | 7.14 | — | — | — | — | — |
| 2 | 50:50 | 63.67 | 3D | 24,000 | 189,000 | 7.8 | 5.2 |
| 3 | 50:50 | 51.14 | — | — | — | — | — |
| 4 | 50:50 | 49.38 | 3D | 30,000 | 190,000 | 6.5 | 8.2 |
| LMW-PO | 0:100 | 1550 | 3D | 25,000 | 60,000 | 2.5 | 1.7 |

Figure 2:
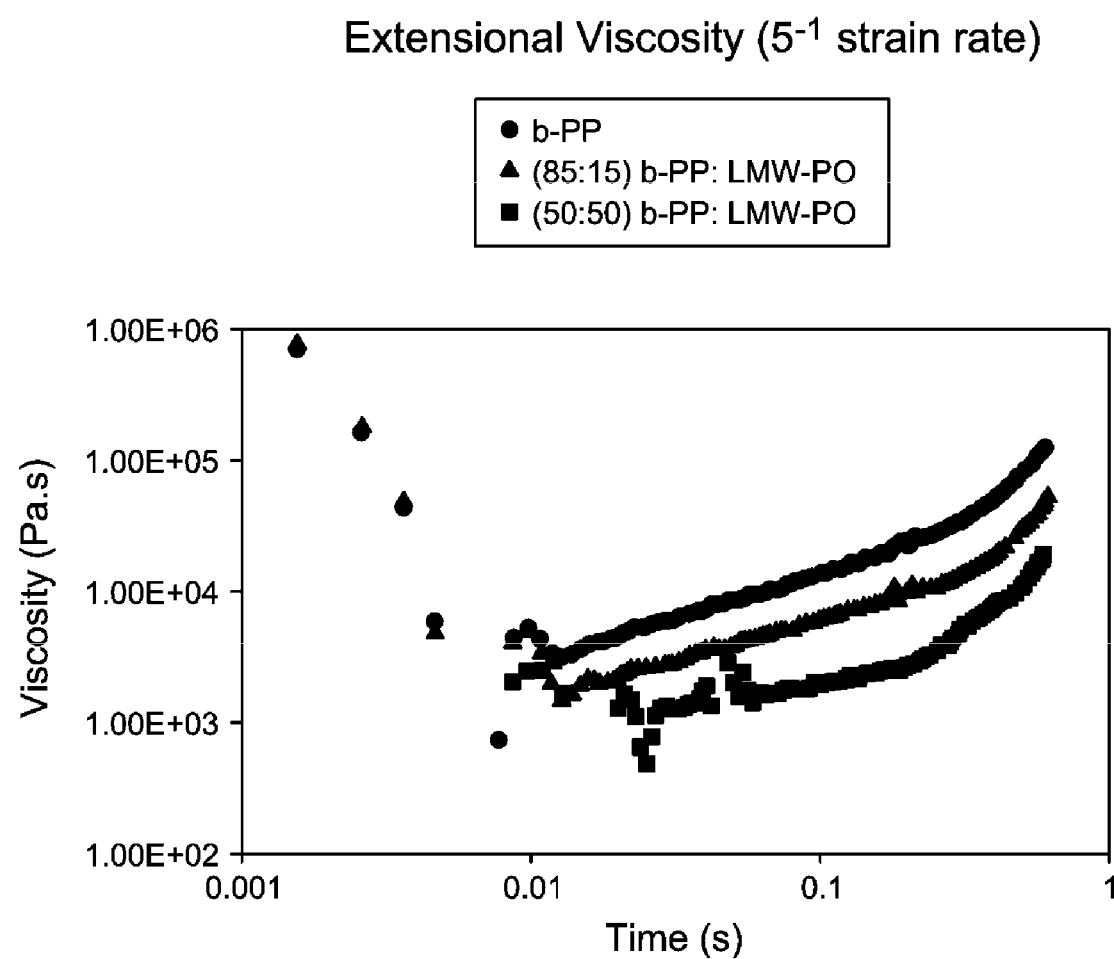
FIG. 2 is extensional rheology traces of a comparative and two inventive blends giving viscosity as a function of time at $5^{-1}$ sec rate.
Figure 3:
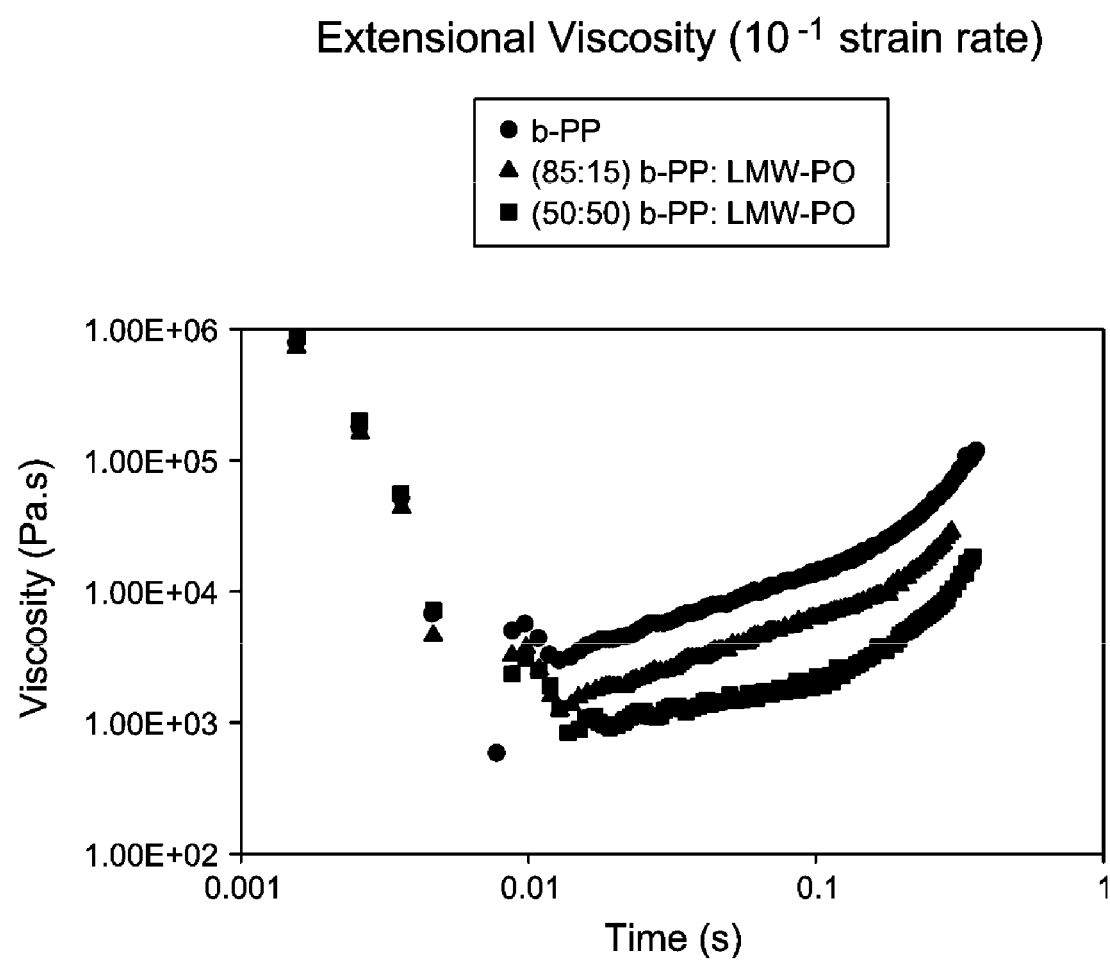
FIG. 3 is extensional rheology traces of a comparative and two inventive blends giving viscosity as a function of time at $10^{-1}$ sec rate.
Figure 4:
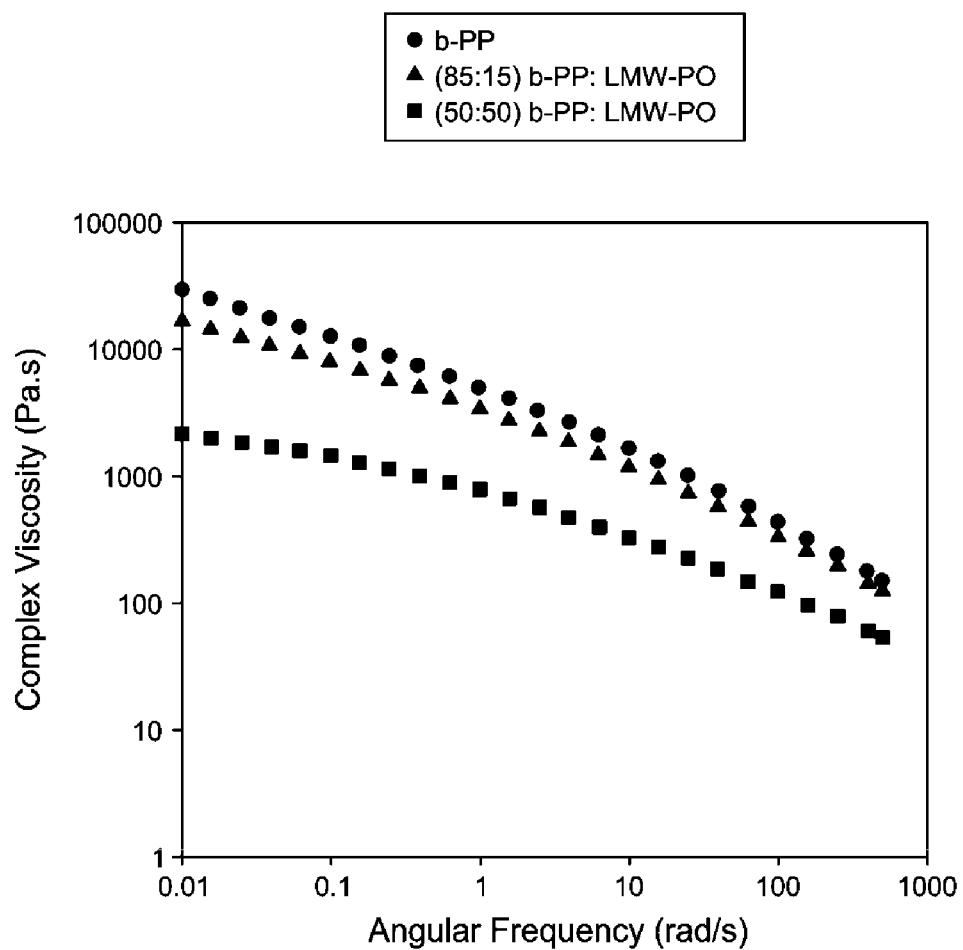
FIG. 4 is SAOS traces of a comparative and two inventive blends giving angular frequency as a function of shear viscosity.

The SAOS data in FIG. 4 demonstrate that the viscosity, and hence processability, of the polypropylene compositions are improved over the branched polypropylene alone, but the data in FIGS. 1 to 3 demonstrate that the compositions still possess a desirable level of strain hardening from the branched polypropylenes. Thus, the polypropylene composition exhibits at least 10% lower complex viscosity at 500 rad/sec compared to the branched polypropylene as determined by small-amplitude oscillatory spectroscopy at 190° C., while preferably the composition exhibits at least 90% the strain hardening that is exhibited by the branched polypropylene at the same strain rate.

As used herein, "consisting essentially of" means that the claimed polymer or polymer blend includes only the named components and no additional components that will alter its measured properties by any more than 10 or 20%; and most preferably means that additional components or "additives" are present to a level of less than 5, or 4, or 3, or 2 wt % by weight of the composition. Such additives can include, for example, fillers, colorants, antioxidants, alkyl-radical scavengers, anti-UV additives, acid scavengers, slip agents, curatives and cross-linking agents, aliphatic and/or cyclic containing oligomers or polymers (also referred to as "hydrocarbon resins"), and other additives well known in the art.

As it relates to a process, the phrase "consisting essentially of" means that there are no other process features that will alter the claimed properties of the polymer, polymer blend or article produced therefrom by any more than 10 or 20%.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A process to produce a polypropylene composition comprising:
   combining 95 wt % to 60 wt % of a branched polypropylene with 5 wt % to 40 wt % of a low molecular weight polyolefin and 5 wt % or less additives, by weight of the polypropylene composition, wherein the branched polypropylene has a melt flow rate (ASTM D1238, 230° C./2.16 kg) within a range from 0.1 g/10 min to 20 g/10 min and a melt strength of at least 20 cN (190° C.), and the low molecular weight polyolefin being a polypropylene copolymer having a melt flow rate (ASTM D1238, 230° C./2.16 kg) of at least 200 g/10 min; and
   recovering the polypropylene composition.

2. The process of claim 1, wherein the low molecular weight polyolefin has a melt flow rate (ASTM D1238, 230° C./2.16 kg) within a range from 200 g/10 min to 5,000 g/10 min.

3. The process of claim 1, wherein the low molecular weight polyolefin has an Mw/Mn of less than 5.

4. The process of claim 1, further comprising:
   combining a linear polypropylene with an organic peroxide to obtain the branched polypropylene.

5. The process of claim 4, wherein the linear polypropylene has a melt flow rate (ASTM D1238, 230° C./2.16 kg) within a range from 0.1 g/10 min to 20 g/10 min and a melt strength of at least 10 cN (190° C.).

6. The process of claim 4, wherein the linear polypropylene has an Mw/Mn of at least 5.

7. The process of claim 4, wherein the organic peroxide is selected from compounds having one or a combination of the following structures:

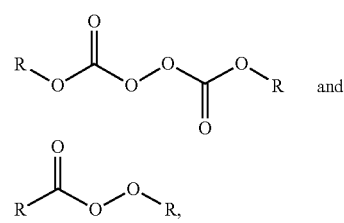

wherein each "R" group is independently selected from the group consisting of hydrogen, C1 to C24 linear alkyls, C1 to C24 secondary alkyls, C1 to C24 tertiary alkyls, C7 to C30 alkylaryls, C7 to C30 arylalkyls, and substituted versions thereof.

8. The process of claim 4, further comprising:
combining 0.1 wt % to 5 wt % of the organic peroxide by weight of the linear polypropylene and organic peroxide.

9. The process of claim 4, wherein the melt strength of the branched polypropylene is greater than the melt strength of the linear polypropylene.

10. The process of claim 1, wherein diene monomers are absent from the branched polypropylene and/or all process steps in forming the branched polypropylene.

11. The process of claim 1, further comprising:
melt extruding the polypropylene composition to form a foamed, thermoformed and/or extruded article.

12. A polypropylene composition comprising:
95 wt % to 60 wt % of a branched polypropylene by weight of the polypropylene composition, wherein the branched polypropylene has a melt flow rate (ASTM D1238, 230° C./2.16 kg) within a range from 0.1 g/10 min to 20 g/10 min and a melt strength of at least 20 cN (190° C.);
5 wt % to 40 wt % of a low molecular weight polyolefin by weight of the polypropylene composition, the low molecular weight polyolefin being a polypropylene copolymer having a melt flow rate of at least 200 g/10 min (ASTM D1238, 230° C./2.16 kg); and
5 wt % or less additives by weight of the polypropylene composition.

13. The polypropylene composition of claim 12, wherein the branched polypropylene has an Mw/Mn of at least 5.

14. The polypropylene composition of claim 12, wherein the low molecular weight polyolefin has a melt flow rate (ASTM D1238, 230° C./2.16 kg) within a range from 200 g/10 min to 5,000 g/10 min.

15. The polypropylene composition of claim 12, wherein the low molecular weight polyolefin has an Mw/Mn of less than 5.

16. The polypropylene composition of claim 12, wherein the polypropylene composition exhibits at least 90% of the strain hardening that is exhibited by the branched polypropylene alone as measured by extensional rheology at 190° C. at the same strain rate.

17. The polypropylene composition of claim 12, wherein the polypropylene composition exhibits at least 10% lower complex viscosity at 500 rad/sec compared to the branched polypropylene alone as determined by small-amplitude oscillatory spectroscopy at 190° C.

18. A foamed, thermoformed, or extruded article comprising the polypropylene composition of claim 12.

19. The polypropylene composition of claim 12, wherein the polypropylene copolymer comprises propylene and ethylene.

20. A process to produce a polypropylene composition comprising:
combining a linear polypropylene having a melt strength within a range from 10 to 40 cN (190° C.) with an organic peroxide to obtain a branched polypropylene having a melt strength within a range from 20 to 80 cN (190° C.), a melt flow rate within a range of 0.1 to 20 g/10 min (ASTM D1238, 230° C./2.16 kg), and a Mw/Mn of at least 5, wherein the melt strength of the branched polypropylene is greater than the melt strength of the linear polypropylene; and
combining 95 wt % to 60 wt % of the branched polypropylene with 5 wt % to 40 wt % of a low molecular weight polyolefin and 5 wt % or less additives, by weight of the polypropylene composition, the low molecular weight polyolefin being a polypropylene copolymer having a melt flow rate (ASTM D1238, 230° C./2.16 kg) of at least 200 g/10 min and an Mw/Mn of less than 5;
wherein the polypropylene composition has a melt flow rate (ASTM D1238, 230° C./2.16 kg) within a range from 0.5 to 40 g/10 min, a melt strength within a range from 20 to 80 cN (190° C.), and exhibits at least 90% the strain hardening that is exhibited by the branched polypropylene alone.

21. A foamed, thermoformed, and/or extruded article comprising a polypropylene composition comprising:
95 wt % to 60 wt % of a branched polypropylene by weight of the polypropylene composition, the branched polypropylene having a melt strength within a range from 20 to 80 cN (190° C.) and a melt flow rate (ASTM D1238, 230° C./2.16 kg) within a range of 0.1 to 20 g/10 min;
5 wt % to 40 wt % of a low molecular weight polyolefin by weight of the polypropylene composition, the low molecular weight polyolefin being a polypropylene copolymer having a melt flow rate (ASTM D1238, 230° C./2.16 kg) of at least 200 g/10 min; and
5 wt % or less additives by weight of the polypropylene composition;
wherein the polypropylene composition has a melt flow rate (ASTM D1238, 230° C./2.16 kg) within a range from 0.5 to 40 g/10 min, a melt strength within a range from 20 to 80 cN (190° C.), and exhibits at least 90% of the strain hardening that is exhibited by the branched polypropylene alone.

* * * * *